(12) United States Patent  
Kan et al.

(10) Patent No.: US 11,662,206 B2  
(45) Date of Patent: May 30, 2023

(54) MICROMACHINED GYROSCOPE

(71) Applicants: AAC Kaitai Technologies (Wuhan) CO., LTD, Hubei (CN); AAC ACOUSTIC TECHNOLOGIES (SHENZHEN) CO., LTD., Shenzhen (CN)

(72) Inventors: Xiao Kan, Shenzhen (CN); Zhao Ma, Shenzhen (CN); Shan Yang, Shenzhen (CN); Zhan Zhan, Shenzhen (CN); Hongtao Peng, Shenzhen (CN); Yang Li, Shenzhen (CN); Veronica Tan, Singapore (SG); Yan Hong, Shenzhen (CN); Kahkeen Lai, Singapore (SG)

(73) Assignees: AAC KAITAI TECHNOLOGIES (WUHAN) CO., LTD, Wuhan (CN); AAC Acoustic Technologies (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 17/566,677

(22) Filed: Dec. 30, 2021

(65) Prior Publication Data  
US 2023/0110948 A1    Apr. 13, 2023

(30) Foreign Application Priority Data  
Oct. 8, 2021   (CN) .......................... 202122423251.9

(51) Int. Cl.  
*G01C 19/5762*    (2012.01)

(52) U.S. Cl.  
CPC ................................ *G01C 19/5762* (2013.01)

(58) Field of Classification Search  
CPC ...................................................... G01C 19/576  
See application file for complete search history.

(56) References Cited

U.S. PATENT DOCUMENTS

| | | | |
|---|---|---|---|
| 6,349,597 B1 * | 2/2002 | Folkmer | G01C 19/5712 73/504.12 |
| 8,096,181 B2 * | 1/2012 | Fukumoto | G01P 15/18 73/504.12 |

* cited by examiner

*Primary Examiner* — Paul M. West  
*Assistant Examiner* — Mark A Shabman  
(74) *Attorney, Agent, or Firm* — W&G Law Group

(57) ABSTRACT

The present invention provides a micromachined gyroscope, including: a base; an anchor point fixed to the base; a number of vibration structures; and a drive structure used for driving the vibration structure to vibrate in a x-y plane along a ring direction. The drive structure includes at least four groups arranged at intervals along the ring direction and symmetrical about an x axis and a y axis. The micromachined gyroscope works in two vibration modes interchanging with each other, including a driving mode status working in a first mode status and a testing mode status working in a second mode status. By virtue of the configuration described in the invention, the micromachined gyroscope can realize three-axis detection at the same time, and greatly improves the quality utilization rate of the vibration structure.

9 Claims, 4 Drawing Sheets

MICROMACHINED GYROSCOPE

FIELD OF THE PRESENT DISCLOSURE

The present invention relates a micromachined gyroscope.

DESCRIPTION OF RELATED ART

The micromachined gyroscope, or MEMS (Micro Electro Mechanical Systems) gyroscope, is a typical angular velocity micro sensor. Because of its small size, low power consumption and convenient processing advantages, it has a very wide range of applications in the consumer electronics market. With the gradual improvement in performance in recent years, MEMS gyroscopes have been widely used in fields such as industry, automobiles, and virtual reality.

MEMS gyroscopes can be divided into two types: linear vibration tuning fork type gyroscopes and body vibration disc type gyroscopes. Among them, the driving mode status and testing mode status of the disc-type gyroscope have degenerate vibration shapes, high sensitivity and simple structure, and gradually become a more widely used gyroscope. However, the vibration structure in the disc gyroscope has a low mass utilization rate and low sensitivity. In addition, the disc-type gyroscope in the prior art can only detect the rotation of the test mode status in the production plane, and cannot simultaneously detect the rotation of the third axis of the test mode status out of the plane.

Therefore, it is necessary to provide an improved micromachined gyroscope to solve the above-mentioned problems.

SUMMARY OF THE PRESENT INVENTION

The purpose of the present invention is to provide a micromachined gyroscope, which can realize three-axis detection at the same time, and greatly improves the quality utilization rate of the vibration structure.

To achieve the above-mentioned objects, the present invention provides a micromachined gyroscope, including: a base; an anchor point fixed to the base; a plurality of vibration structures suspended on the base and mechanically coupled with the anchor point; and a drive structure used for driving the vibration structure to vibrate in a x-y plane along a ring direction. The driving structure includes at least four groups arranged at intervals along the ring direction and symmetrical about an x axis and a y axis. Besides, the micromachined gyroscope includes a sensing element for detecting the deviation of the vibration structure caused by Coriolis force. The micromachined gyroscope works in two vibration modes interchanging with each other, including a driving mode status working in a first mode status and a testing mode status working in a second mode status; and in the second mode status, the vibration structures move in the x-y plane or outside the x-y plane under the action of the Coriolis force.

In addition, the micromachined gyroscope further includes a first elastic member for connecting the anchor point and the vibration structure, and a second elastic member for connecting two adjacent vibration structures; the first elastic member has a smallest elastic coefficient in a radial direction; and the second elastic member has a smallest elastic modulus along the ring direction.

In addition, the vibration structure is a fan-shaped structure, and a central angle of the vibration structure is less than or equal to 90 degrees.

In addition, when the vibration structure is vibrating in the first mode status, the vibration structure vibrates in the ring direction and the vibration phase is the same.

In addition, when the vibration structure vibrates in the first mode status, any two adjacent vibration structures vibrate in the ring direction and the vibration phases are opposite.

In addition, the sensing element includes an in-surface transducer for coupling a mechanical field and an electric field in a plane where the vibration structure is located, and an out-surface transducer for coupling the mechanical field and the electric field outside the plane where the vibration structure is located.

In addition, an energy conversion form of the in-surface transducer includes one or more combinations of capacitance, inductance, pyroelectric, and piezoelectric; an energy conversion form of the out-surface transducer includes one or more combinations of capacitance, inductance, pyroelectric, and piezoelectric.

In addition, the in-surface transducer is arranged inside or outside the vibration structure; the out-surface transducer is arranged between the vibration structure and the base.

In addition, the driving structure is a comb-shaped electrode structure.

In addition, the micromachined gyroscope has an insulation layer on the base; wherein the anchor point, the in-surface transducer, and the out-surface transducer are all connected to the base through the insulation layer.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

MEMS (Micro-Electro Mechanical Systems) refers to a complete micro-electromechanical system that integrates mechanical elements, micro sensors, micro actuators, signal processing and control circuits, interface circuits, communications and power supplies. The micromachined gyroscope is MEMS gyroscope. MEMS gyroscope is widely used in various portable electronic devices such as mobile phones, IPAD, AR\VR wearable devices, etc. It is often used to detect physical quantities related to rotation, such as angular velocity. The micromachined gyroscope can realize the somatosensory interaction between the user and the device, and has a wide range of application prospects.

Figure 1:
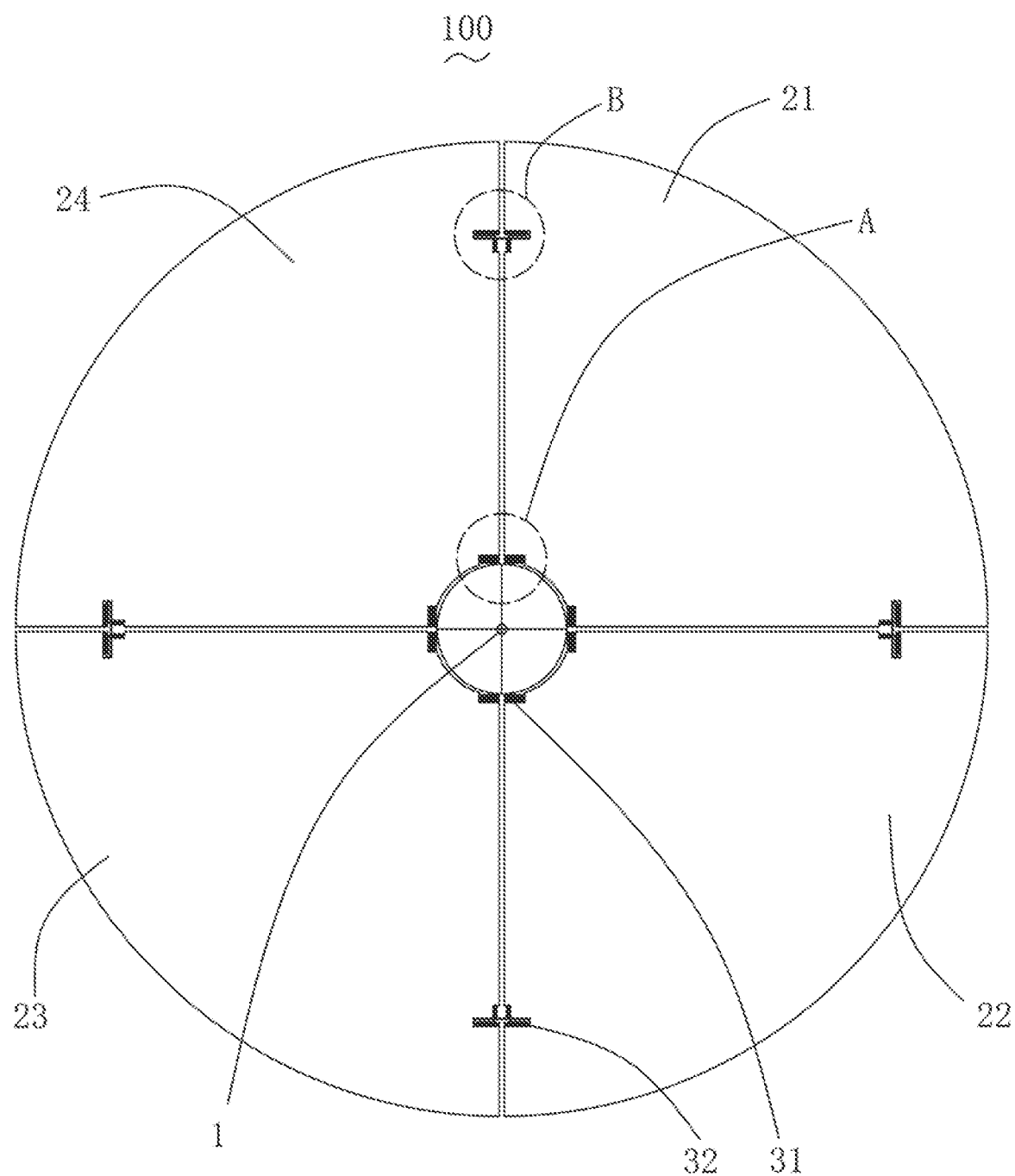
FIG. 1 is illustrative view of a micromachined gyroscope in accordance with an embodiment of the present invention.

Please refer to FIG. 1. The micromachined gyroscope 100 includes a base (not shown), an anchor point 1 fixed to the base, and four vibration structure 2. The base is used to provide support for each component. The four vibration structures 2 are all located in the same x-y plane, and they are all fan-shaped structures. The driving structure is a comb-shaped electrode structure. The central angle of each vibration structure is 90 degrees, and four of the vibration structures are arranged around the anchor point 1. The first vibration structure 21, the second vibration structure 22, the third vibration structure 23 and the fourth vibration structure 24 are arranged at intervals in sequence. The first vibration structure 21 and the second vibration structure 22 are symmetrical to the second vibration structure 23 and the fourth vibration structure 24 about the x axis. The first vibration structure 21 and the fourth vibration structure 24 are symmetrical to the second vibration structure 22 and the third vibration structure 23 about the y axis.

The micromachined gyroscope 100 works in two vibration modes, and the two vibration modes include driving mode status working in first mode status, and testing mode status working in second mode status. The two vibration modes are interchangeable with each other. When the micromachined gyroscope 100 works in the driving mode status under the first mode status, the vibration structure 2 vibrates in the x-y plane along the ring direction.

Figure 2:
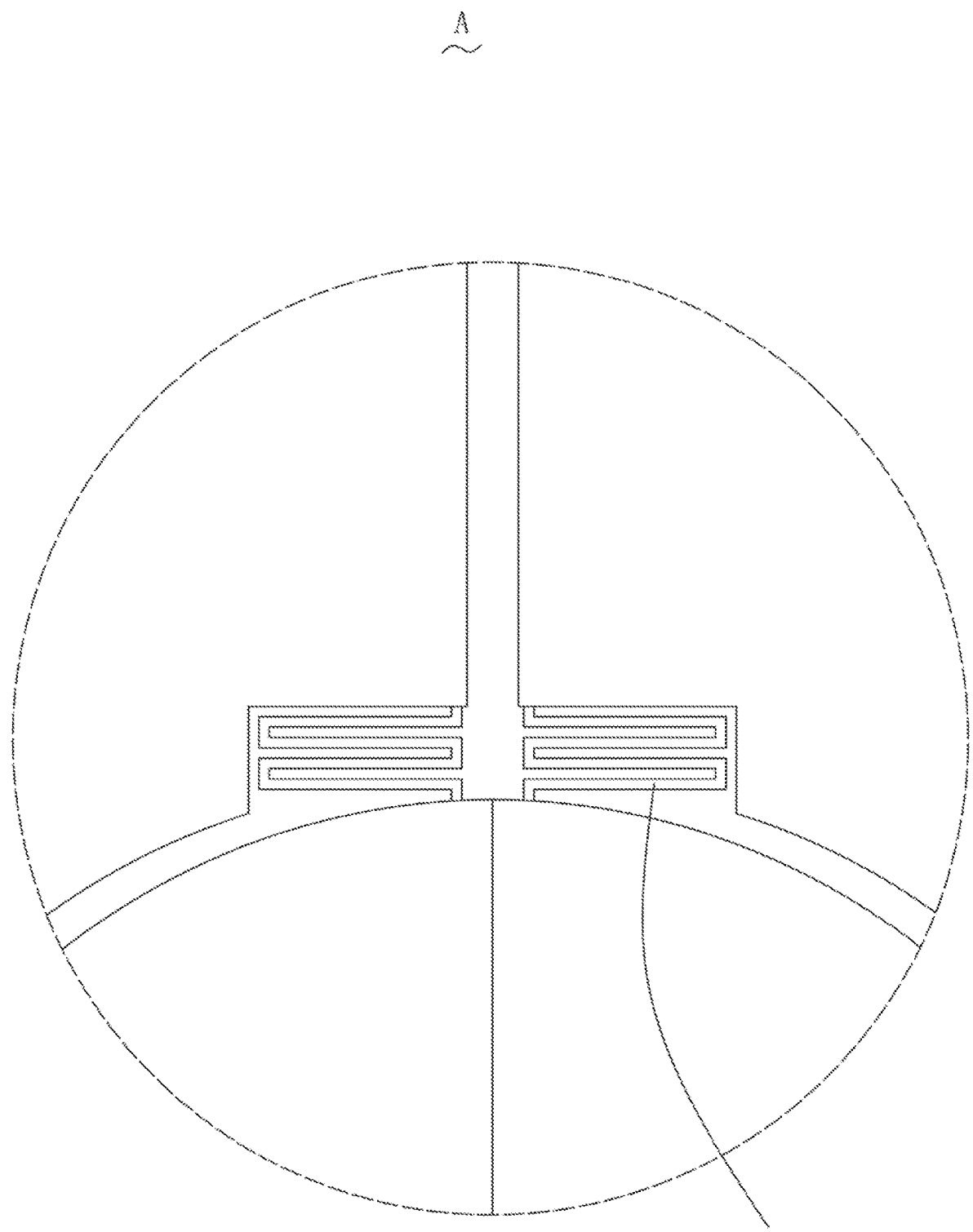
FIG. 2 is a partially enlarged view of part A in FIG. 1.
Figure 3:
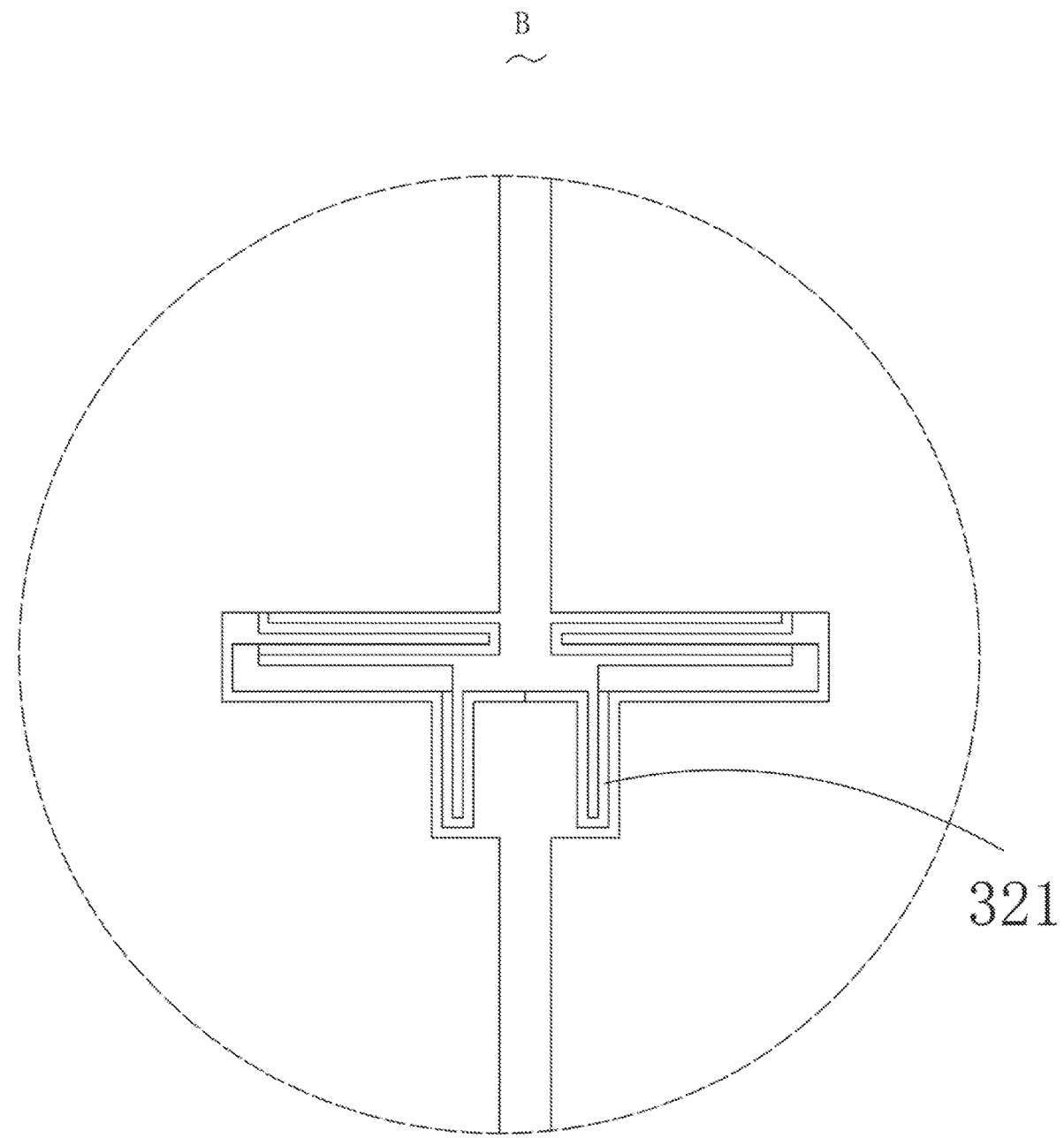
FIG. 3 is a partially enlarged view of part B in FIG. 1.

As shown in FIGS. 2-3, the micromachined gyroscope further includes a first elastic member 31 for connecting the anchor point 1 and the vibration structure 2, and a second elastic member for connecting two adjacent vibration structures 2 32. The first elastic member 31 and the second elastic member 32 are radially spaced apart. The first elastic member has the smallest elastic coefficient in the radial direction. The second elastic member has the smallest elastic modulus along the ring direction. Specifically, the first elastic member includes a plurality of first elastic arms 311 that are folded and extended along the radial direction. The second elastic member includes a plurality of second elastic arms 321 folded and extended along the ring direction. It should be noted that in the structure of the micromachined gyroscope provided by the present invention. The first elastic member 31 and the second elastic member 32 are not limited to the structure disclosed in this embodiment. Any design structure of an elastic element that satisfies the limitation of its elastic coefficient shall be within the protection scope of the present invention.

By setting first elastic member 31, vibration structure 2 and anchor point 1 are elastically connected, and the first elastic member has the smallest elastic coefficient in the radial direction. The micromachined gyroscope provided by the present invention can effectively reduce the coupling between different mode status movements of the vibration structure. In this way, the interference of different mode status motions is avoided, the displacement of the non-motion weight is reduced, and the quadrature error is reduced. Conducive to the bias stability of the micromachined gyroscope.

Figure 4:
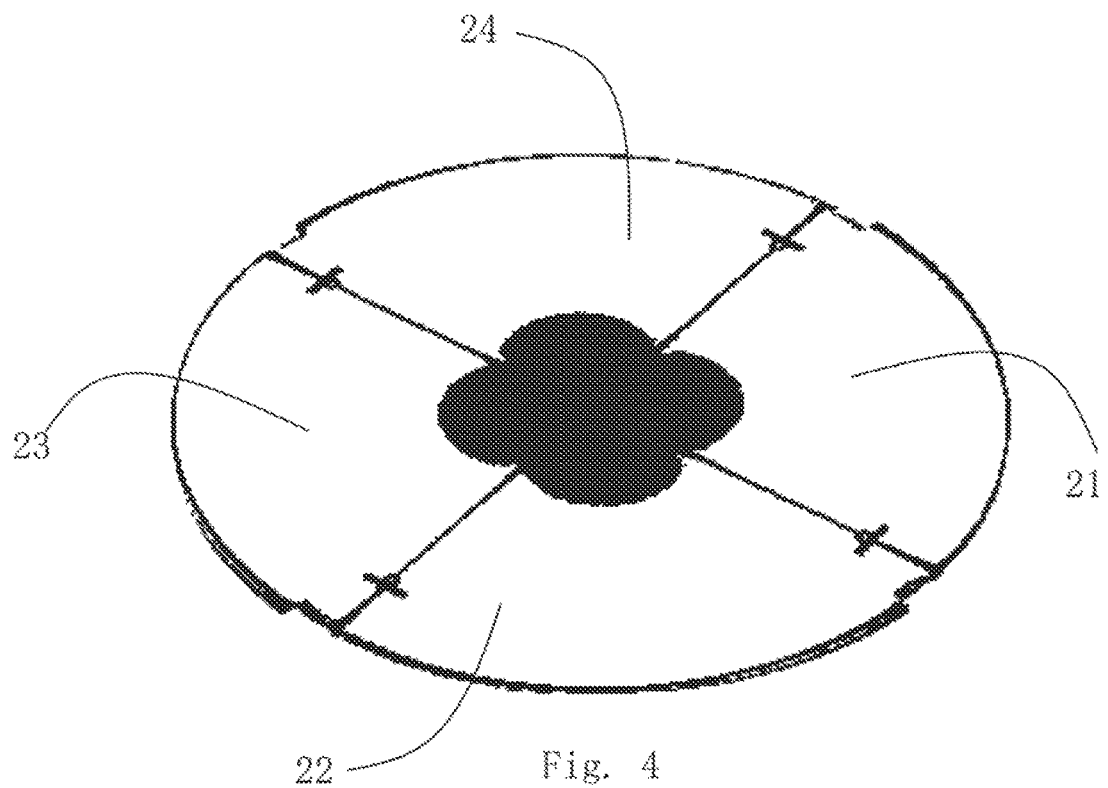
FIG. 4 illustrates a first embodiment of a first vibration mode of the micromachined gyroscope shown in FIG. 1.
Figure 5:
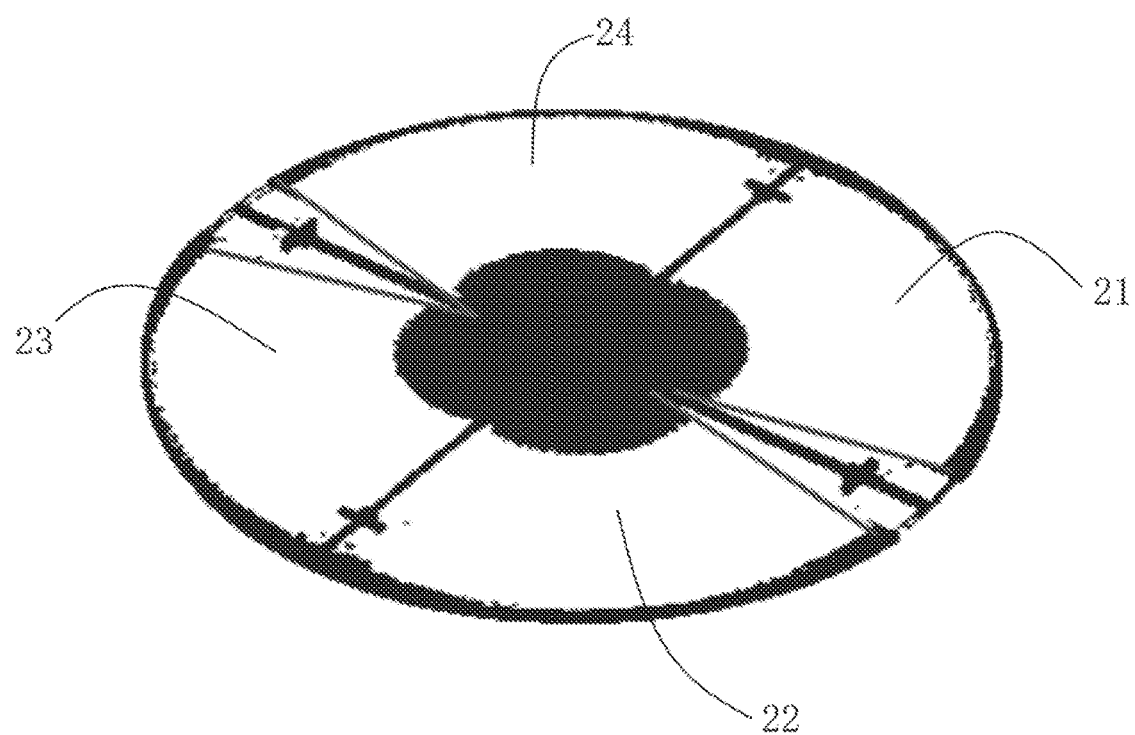
FIG. 5 illustrates a second embodiment of the first vibration mode of the micromachined gyroscope shown in FIG. 1.

By setting the second elastic 32 to elastically connect any two adjacent vibration structures 2, it is convenient to realize in-phase (as shown in FIG. 4) or anti-phase (as shown in FIG. 5) between adjacent vibration structures. When the adjacent vibration structure is set to anti-phase vibration in the first mode status, the micromachined gyroscope provided by the present invention can realize differential detection. Thereby, it can effectively immune the influence of acceleration interference on micromachined gyroscope and quadrature error.

As shown in FIG. 4, in the first mode status, the vibration structure 2 vibrates in the ring direction and the vibration phase is the same (for example, both vibrate in the clockwise direction around the ring direction). In other optional embodiments, as shown in FIG. 5, when the vibration structure 2 vibrates in the first mode status, any two adjacent vibration structure 2 vibrate in the ring direction and the vibration phases are opposite (for example, the vibration phase is opposite). Both the first vibration structure 21 and the third vibration structure 23 vibrate in a clockwise direction around the ring. The second vibration structure 22 and the fourth vibration structure 24 shown both vibrate in a counterclockwise direction around the ring).

The micromachined gyroscope 100 also includes a sensing element 4, and the sensing element 4 includes an in-surface transducer (not shown) and an out-surface transducer (not shown). Both in-surface transducer and out-surface transducer can realize the coupling of mechanical field (including mechanical force and mechanical displacement) and electric field in the structural plane.

The form can be, but is not limited to, one or more combinations of capacitance, inductance, pyroelectric, and piezoelectric. The in-surface transducer and out-surface transducer can obtain the vibration displacement of driving mode status and the vibration displacement of testing mode status. It can match the frequency between the driving mode status and the detection of the two mode status, and play a role in suppressing the orthogonal error of the structure.

When inputting angular velocity of x axis into the micromachined gyroscope, the first vibration structure 21 and the second vibration structure 22 swing towards the x-y plane. The third vibration structure 23 and the fourth vibration structure 24 swing toward the x-y plane. When entering angular velocity of y axis in the micromachined gyroscope, the first vibration structure 21 and fourth vibration structure 24 swing upwards on the x-y plane; the second vibration structure 22 and third vibration structure 23 swing downwards on the x-y plane. When the micromachined gyroscope is input to angular velocity of z axis, the vibration structure 2 all moves radially toward the outside.

When the angular velocity of x axis is input into the micromachined gyroscope, the first vibration structure 21 and third vibration structure 23 are flipped outwards in the same direction, and the second vibration structure 22 and fourth vibration structure 24 are flipped outwards in the same direction. When inputting angular velocity of y axis in the micromachined gyroscope, the first vibration structure 21 and third vibration structure 23 are flipped outwards in the same direction from the x-y plane, and the flipping direction is opposite to that when the x axis angle is input. The second vibration structure 22 and the fourth vibration structure 24 are flipped out of the x-y plane in the same direction, and the flipping direction is opposite to that when x axis is input. When the micromachined gyroscope inputs angular velocity of z axis, the first vibration structure 21 and the third vibration structure 23 move radially toward the outside. The second vibration structure 22 and the fourth vibration structure 24 move radially toward the inside.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A micromachined gyroscope, including:
a base;
an anchor point fixed to the base;
a plurality of vibration structures suspended on the base and mechanically coupled with the anchor point;
a drive structure used for driving the vibration structures to vibrate in a x-y plane along a ring direction, including at least four groups arranged at intervals along the ring direction and symmetrical about an x axis and a y axis;
a sensing element for detecting the deviation of the vibration structures caused by Coriolis force;
the micromachined gyroscope works in two vibration modes interchanging with each other, including a driving mode status working in a first mode status and a testing mode status working in a second mode status; wherein
the vibration structures include at least four vibration structures arranged at intervals along the ring direction and symmetrical about an x axis and a y axis;
in the second mode status, the vibration structures move in the x-y plane or outside the x-y plane under the action of the Coriolis force; and
the micromachined gyroscope includes a first elastic member for connecting the anchor point and the vibration structures, and a second elastic member for connecting two adjacent vibration structures, the first elastic member has a smallest elastic coefficient in a radial direction, and the second elastic member has a smallest elastic modulus along the ring direction.

2. The micromachined gyroscope as described in claim 1, wherein the vibration structure is a fan-shaped structure, and a central angle of each vibration structure is less than or equal to 90 degrees.

3. The micromachined gyroscope as described in claim 1, wherein when the vibration structures are vibrating in the first mode status, the vibration structures vibrate in the ring direction and the vibration phase is the same.

4. The micromachined gyroscope as described in claim 1, wherein when the vibration structures vibrate in the first mode status, any two adjacent vibration structures vibrate in the ring direction and the vibration phases are opposite.

5. The micromachined gyroscope as described in claim 1, wherein the sensing element includes an in-surface transducer for coupling a mechanical field and an electric field in a plane where the vibration structures are located, and an out-surface transducer for coupling the mechanical field and the electric field outside the plane where the vibration structures are located.

6. The micromachined gyroscope as described in claim 5, wherein an energy conversion form of the in-surface transducer includes one or more combinations of capacitance, inductance, pyroelectric, and piezoelectric; an energy conversion form of the out-surface transducer includes one or more combinations of capacitance, inductance, pyroelectric, and piezoelectric.

7. The micromachined gyroscope as described in claim 5, wherein the in-surface transducer is arranged inside or outside the vibration structures;
the out-surface transducer is arranged between the vibration structures and the base.

8. The micromachined gyroscope as described in claim 5 having an insulation layer on the base; wherein the anchor point, the in-surface transducer, and the out-surface transducer are all connected to the base through the insulation layer.

9. The micromachined gyroscope as described in claim 1, wherein the driving structure is a comb-shaped electrode structure.

* * * * *